(12) United States Patent
Seidl

(10) Patent No.: US 10,955,015 B2
(45) Date of Patent: Mar. 23, 2021

(54) METHOD AND DEVICE FOR OPERATING A DRIVE TRAIN

(71) Applicant: GKN Automotive Ltd., Redditch (GB)

(72) Inventor: Holger Seidl, Siegburg (DE)

(73) Assignee: GKN Automotive Ltd., Redditch (GB)

(*) Notice: Subject to any disclaimer, the term of this patent is extended or adjusted under 35 U.S.C. 154(b) by 0 days.

(21) Appl. No.: 16/489,713

(22) PCT Filed: Mar. 3, 2017

(86) PCT No.: PCT/EP2017/055089
§ 371 (c)(1),
(2) Date: Aug. 29, 2019

(87) PCT Pub. No.: WO2018/157950
PCT Pub. Date: Sep. 7, 2018

(65) Prior Publication Data
US 2020/0003265 A1    Jan. 2, 2020

(51) Int. Cl.
*F16D 48/06*    (2006.01)

(52) U.S. Cl.
CPC ...... *F16D 48/06* (2013.01); *F16D 2500/1022* (2013.01); *F16D 2500/1024* (2013.01);
(Continued)

(58) Field of Classification Search
CPC ............. F16D 48/06; F16D 2500/1022; F16D 2500/1024; F16D 2500/1026;
(Continued)

(56) References Cited

U.S. PATENT DOCUMENTS 6,378,682 B1 * 4/2002 Mohan ................ F16D 25/0638
192/103 F
2014/0371998 A1    12/2014 Moorman et al.
(Continued)

FOREIGN PATENT DOCUMENTS

| DE | 102009043243 A1 | 5/2010 |
| JP | H03-33516 A | 2/1991 |
| JP | 2004-208460 A | 7/2004 |

OTHER PUBLICATIONS

International Search Report and Written Opinion for PCT/EP2017/055089 dated Nov. 27, 2017 (9 pages; with English translation).
(Continued)

*Primary Examiner* — David J Hlavka
(74) *Attorney, Agent, or Firm* — Bejin Bieneman PLC

(57) ABSTRACT

A vehicle drive train, has a clutch unit actuatable by an actuating unit, and a sensor for determining the coupling status. The actuating unit includes an electromagnetic actuator having a piston movable from a starting to an end position. At least the piston and the clutch are acted on by a transmission fluid. Operating the drive train can include:
 a) actuating the actuator and moving the piston from the starting position;
 b) ascertaining a measured sensor value;
 c) ascertaining a temperature of the transmission fluid by measuring an electrical resistance of the actuator and/or measuring a first time interval between actuation of the actuator according to step a) and the detection by the sensor of an intermediate position that is reached by the piston;
 d) determining an actual position of the piston based on the measured sensor value and the temperature; and
 e) moving the piston, starting from the determined actual position, into the end position.

14 Claims, 2 Drawing Sheets

Figure 1:
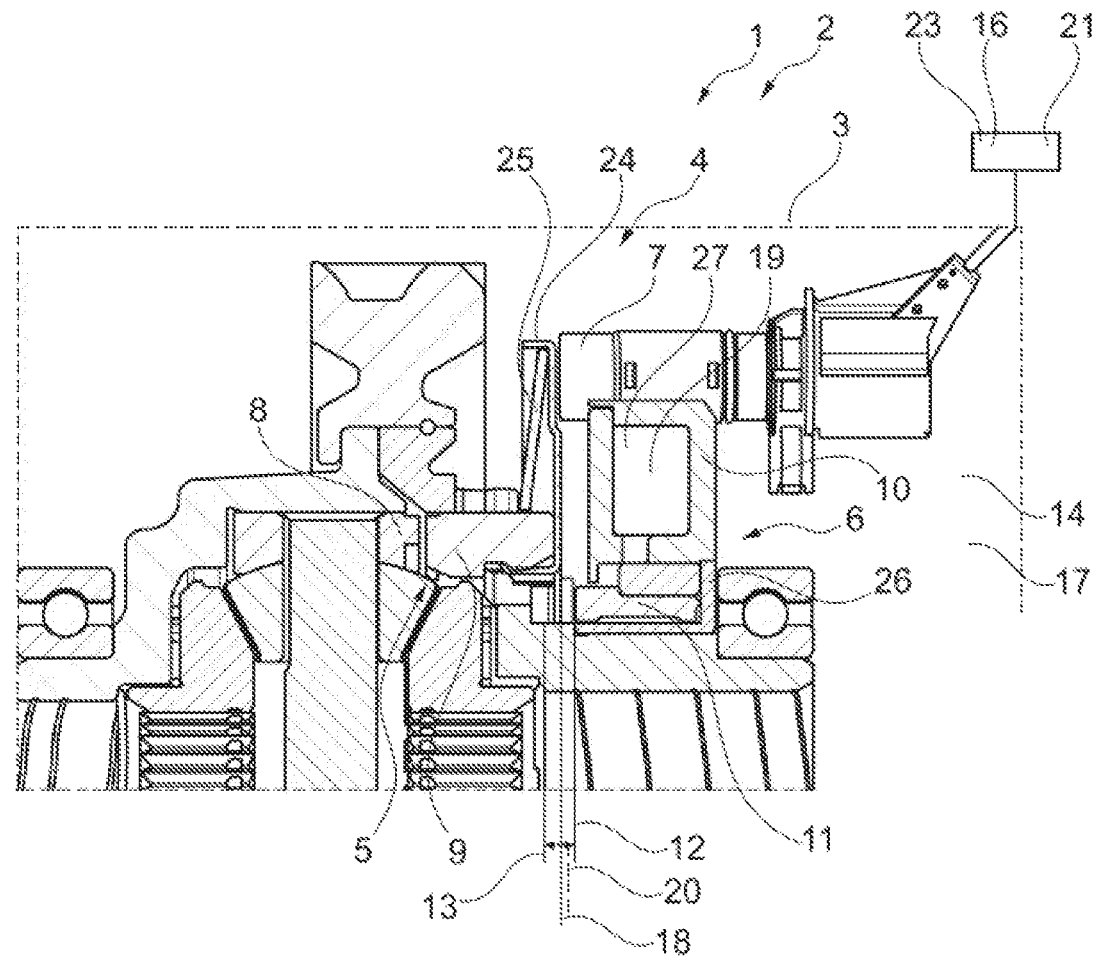

(52) U.S. Cl.
CPC ............... *F16D 2500/1026* (2013.01); *F16D 2500/1066* (2013.01); *F16D 2500/10412* (2013.01); *F16D 2500/10462* (2013.01); *F16D 2500/3022* (2013.01); *F16D 2500/3026* (2013.01); *F16D 2500/3028* (2013.01); *F16D 2500/30803* (2013.01); *F16D 2500/3166* (2013.01); *F16D 2500/50245* (2013.01); *F16D 2500/7041* (2013.01)

(58) Field of Classification Search
CPC . F16D 2500/10412; F16D 2500/10462; F16D 2500/1066; F16D 2500/3022; F16D 2500/3026; F16D 2500/3028; F16D 2500/30803; F16D 2500/3166; F16D 2500/50245; F16D 2500/7041
See application file for complete search history.

(56) References Cited

U.S. PATENT DOCUMENTS

| | | | |
|---|---|---|---|
| 2015/0266468 A1 | 9/2015 | Moon et al. | |
| 2016/0347171 A1* | 12/2016 | Ogawa | B60W 30/02 |
| 2016/0355086 A1* | 12/2016 | Ogawa | B60K 17/344 |
| 2017/0008396 A1* | 1/2017 | Takaishi | B60K 17/348 |

OTHER PUBLICATIONS

Notification of Reasons for Rejection for Application No. JP2019-547623 dated Nov. 24, 2020 (with English translation; 4 pages).

\* cited by examiner

METHOD AND DEVICE FOR OPERATING A DRIVE TRAIN

This application is a national stage of, and claims priority to, Patent Cooperation Treaty Application No. PCT/EP2017/055089, filed on Mar. 3, 2017, which application is hereby incorporated herein by reference in its entirety.

The present disclosure relates to a method and a device for operating a drive train of a vehicle, in particular a motor vehicle. The drive train includes at least a transmission housing, and a clutch unit situated therein with a clutch that acts in a form-fitting manner, as well as an actuating unit for actuating the clutch, and a sensor for determining the coupling status. The clutch includes at least a first clutch component and a second clutch component that are connected to one another in a form-fitting manner when the clutch is actuated. This type of drive train is provided in particular for connecting an electric machine to a drive shaft of the vehicle. Drive power of the electric machine may thus be transmitted via the drive shaft to wheels of the vehicle, for example, in order to drive the vehicle.

The actuating unit includes an electromagnetic actuator having a piston, the piston being moved from a starting position into an end position in order to actuate the clutch. At least the piston and the clutch are acted on at least partially by a transmission fluid. Transmission of a torque via the clutch components should not occur until a fully engaged first state of the clutch components is determined for which the piston is in the end position; a position of the piston may be determined with the sensor. In drive trains having this design, at least the piston and the clutch are at least partially (or also completely) situated in a transmission fluid, in particular oil. The transmission fluid has a temperature-dependent viscosity; the movement of the piston and/or the displacement of the clutch components may be influenced by the viscosity. It has now been found that the sensors likewise generate temperature-dependent measured sensor values, so that it is not possible to (accurately) determine a position of the piston independently of the temperature.

The clutch is generally used for transmitting torques only when the clutch components are fully engaged and establish a secure form-fitting connection with one another (first state of the clutch components). To ensure that this first state is actually present, thus far it has been necessary to estimate the movement of the piston, and to wait for a (predetermined) additional time after the actuator has been actuated and the piston has moved from the starting position.

In the present case, the intent is to avoid the use of a temperature sensor in the transmission housing. Installing a temperature sensor for determining the temperature, and possibly compensating for the resulting temperature influence when the actuator is actuated, entail additional costs and increased installation space, which should be saved. In addition, creating a temperature model, taking into account the energy input into the transmission, is complicated as well as inaccurate.

Provided herein is a method and a device that can actuate the clutch more quickly. Thus provided is a drive train in which a torque may be transmitted via the clutch and provided to the wheels more quickly.

A method is disclosed including the features of claim 1. Further advantageous embodiments of the method and of a device are set forth in the additional claims. It is pointed out that the features individually stated in the dependent claims may be combined with one another in a technologically meaningful way, defining further embodiments. Furthermore, the features set forth in the claims are specified and explained in greater detail in the description, in which further possible embodiments are described.

A method for operating a drive train of a vehicle is proposed, wherein the drive train has at least a transmission housing, and a clutch unit situated therein with a clutch that acts in a form-fitting manner, as well as an actuating unit for actuating the clutch, and a sensor for determining the coupling status, a position of the piston being determinable with the sensor. The clutch (a claw clutch, for example) includes at least a first clutch component and a second clutch component that are connected to one another in a form-fitting manner when the clutch is actuated. The actuating unit includes an electromagnetic actuator having a piston, wherein for actuating the clutch the piston is moved from a starting position into an end position. At least the piston and the clutch are acted on at least partially by a transmission fluid. A torque is transmitted via the clutch components only after a fully engaged first state of the clutch components is determined, wherein the piston is in the end position in this first state.

The method includes at least the following steps:
a) actuating the actuator and moving the piston from the starting position;
b) ascertaining a measured sensor value;
c) ascertaining a temperature of the transmission fluid;
d) determining an actual position of the piston based on the measured sensor value and the temperature; and
e) moving the piston, starting from the determined actual position, into the end position; wherein the temperature of the transmission fluid is ascertained at least by
i. measuring an electrical resistance of the actuator or
ii. measuring a first time interval between actuation of the actuator according to step a) and the detection by the sensor of an intermediate position that is reached by the piston.

Method steps a) through e) may be carried out in the proposed order. It is possible to carry out the method steps partially or completely in a time-overlapping manner. The processes i. and/or ii. may be carried out during step c) or may be triggered by step c). It is possible that all further steps and at least one of the processes i. and ii. are carried out after step a). It is possible that the method proposed herein is carried out for each actuation of the actuator and/or movement of the piston from the starting position that are/is triggered in the drive train.

In particular, at least portions of the clutch as well as the piston of the actuating unit are acted on via the transmission fluid or by the transmission fluid. Thus, the (instantaneous) viscosity of the transmission fluid in particular or preferentially also determines the (actual) switching time of the clutch. In addition, the sensor is exposed to temperature fluctuations resulting from the operation of the transmission and/or the clutch, and for the same states thus generates measured sensor values that vary as a function of the temperature.

In particular, the electromagnetic actuator includes a coil that is acted on by an electric current in order to displace the piston. It is proposed to employ or use the coil of the actuator as a temperature sensor. Use may thus be made of the fact that an electrical resistance of the coil changes as a function of the temperature (process i. of the method). This temperature dependency may, for example, be experimentally determined and stored in a characteristic map for the method.

The actuator may be situated in such a way that the temperature of the coil at least largely corresponds to the temperature of the transmission fluid, and/or that these temperatures change essentially equally. The temperature of the transmission fluid may thus be deduced from the temperature of the coil. The (temperature-dependent) measured sensor value determined in step b) may be interpreted with knowledge of the temperature ascertained in step c). The viscosity of the transmission fluid may be determined via the temperature ascertained in step c. This allows an (accurate) determination of the speed of the components comprising the piston and/or clutch that are moved by the transmission fluid. Thus, starting from the actual position of the piston (step d)), a second time interval after which the piston, starting from the actual position, reaches the end position is determinable.

Thus, from a (more) accurately determined actual position, the piston may be moved further into the predetermined end position. The speed of the piston may be determined as a function of the ascertained temperature. Reaching the first state may thus be determined with increased accuracy, so that enabling the transmission of a torque via the clutch components may now take place more quickly.

According to process ii. of the method, the temperature of the transmission fluid is determined (step c)) based on a first time interval between actuation of the actuator according to step a) and the detection by the sensor of an intermediate position that is reached by the piston. For this purpose, it is provided in particular that the first time interval varies as a function of the viscosity of the transmission fluid (and thus of the temperature of the transmission fluid).

In particular, the variation of the first time interval as a function of the temperature of the transmission fluid is much greater than the variation of the first time interval as a function of the temperature-dependent measuring accuracy of the sensor. For step d), the actual position of the piston may thus be determined with sufficient accuracy, wherein the (temperature-dependent) measured sensor value determined in step b) is interpreted with knowledge of the temperature determined in step c).

The processes i. and ii. of the method may be carried out in parallel (simultaneously and/or successively), so that the particular determined results of these processes for the actual position may be checked for plausibility.

The measured sensor value is preferably determined continuously during the displacement of the piston. In this context, "continuously" means constantly and/or with a high repetition frequency, so that a plurality of measured sensor values are determined during the displacement of the piston.

In particular, the actual position of the piston is determined in step d) from a characteristic map. In particular, correction factors for the measured sensor values as a function of the temperature are stored in the characteristic map. In this way, the measured sensor value determined in step b) may be interpreted and the actual position of the piston may be determined with greater accuracy.

In particular, a threshold value for the (temperature-dependent) measured sensor value determined in step b) is defined, and when the measured sensor value determined in step b) corresponds to the threshold value, it is assumed that the piston has moved from the starting position into the intermediate position, wherein the clutch components in the intermediate position are (not yet) connected to one another in a form-fitting manner. The threshold value in particular is set in such a way that on the one hand a form-fitting connection of the clutch components is not yet present in each case (in particular at low temperature), and on the other hand (at elevated temperature, for example) a form-fitting connection is immediately present when the threshold value is exceeded.

Based on the temperature determined in step c), a second time interval may be determined in which the piston, starting from the actual position, reaches the end position; carrying out step e) is coordinated with the second time interval. Thus, from the (more) accurately determined actual position, the piston may be moved further into the end position, wherein the speed of the piston may likewise be determined as a function of the ascertained temperature. Reaching the first state may be determined with increased accuracy, so that enabling the transmission of a torque via the clutch components may now take place more quickly.

In particular, the second time interval is determined from a characteristic map. Values of the second time interval as a function of the determined temperature may be stored in this characteristic map.

Furthermore, it is proposed that for measuring the electrical resistance of the actuator (for example, the coil of the actuator), the actuator is acted on by a test signal that includes an electric current and a voltage, wherein the piston is not moved by the test signal. In particular, the electric current and/or the voltage are/is so low, or the action by a current pulse takes place for such a short time, that the piston is not moved or displaced by the test signal. The temperature of the transmission fluid may be determined with sufficient accuracy based on the measurement of the electrical resistance (process i. of the method).

In particular the control unit, which is responsible for carrying out the method in the motor vehicle, may have a "self-learning" design. For example, at a first point in time (for a known first temperature of the transmission fluid) a measured sensor value that is present when the piston has reached the end position may be determined. If the temperature of the transmission fluid is known at a later second point in time, an appropriate characteristic curve of the sensor may be selected, so that when the temperature changes, a changed measured sensor value that is identified for reaching the end position may be used.

A drive train of a motor vehicle is disclosed, including at least a transmission housing, and a clutch unit situated therein with a clutch that acts in a form-fitting manner, as well as an actuating unit for actuating the clutch, and a sensor for determining the coupling status; wherein the clutch includes at least a first clutch component and a second clutch component that are connected to one another in a form-fitting manner when the clutch is actuated. The actuating unit includes an electromagnetic actuator having a piston; wherein the piston is movable from a starting position into an end position in order to actuate the clutch; wherein at least the piston and the clutch are acted on at least partially by a transmission fluid. Transmission of a torque via the clutch components does not occur until a fully engaged first state of the clutch components is determined for which the piston is in the end position; wherein a position of the piston may be determined with the sensor. The drive train is suited and configured for carrying out the method, or can carry out the method, according to one of the preceding claims.

In particular at least one control unit is provided that initiates the implementation of the method and is stored in the stated characteristic maps. The statements concerning the method similarly apply for the drive train, and vice versa.

As a precaution, it is noted that the ordinal numbers used herein ("first," "second," "third," . . . ) are used primarily (only) to distinguish between multiple similar objects, variables, or processes; i.e., in particular no dependency and/or sequence of these objects, variables, or processes relative to one another are/is necessarily specified. If a dependency and/or sequence is necessary, this is explicitly indicated herein, or is readily apparent to those skilled in the study of the embodiment specifically described.

The invention and the technical context are explained in greater detail below with reference to the figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description and/or figures. Identical objects are denoted by the same reference numerals, so that explanations concerning other figures may possibly be supplementally used. The figures schematically show the following:

FIG. 1: shows a partial side view of a drive train in cross section; and

Figure 2:
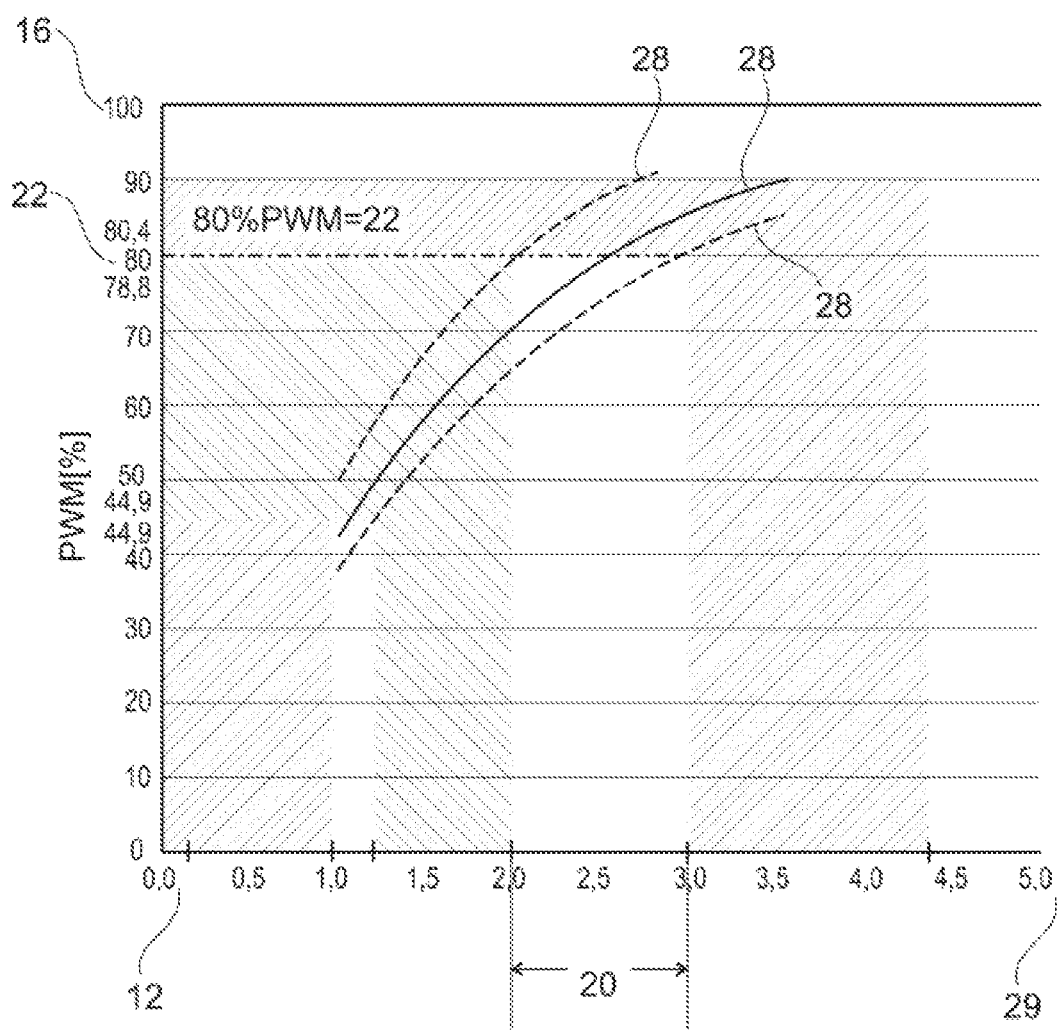

FIG. 2: shows a diagram with multiple characteristic curves of a sensor.

FIG. 1 shows a partial side view of a drive train 1 in cross section. The drive train 1 is part of a vehicle 2. The drive train 1 includes a transmission housing 3, and a clutch unit 4 situated therein with a clutch 5 that acts in a form-fitting manner, as well as an actuating unit 6 for actuating the clutch 5, and a sensor 7 for determining the coupling status. The clutch 5 includes a first clutch component 8 and a second clutch component 9 which are connected to one another in a form-fitting manner when the clutch 5 is actuated. The actuating unit 6 includes an electromagnetic actuator 10 having a piston 11, the piston 11 being moved from a starting position 12 into an end position 13 in order to actuate the clutch 5. The piston 11 and the clutch 5 are situated in a transmission fluid 14. Transmission of a torque via the clutch components 8, 9 should not occur until a fully engaged first state 15 (not shown here) of the clutch components 8, 9 is determined for which the piston 11 is in the end position 13.

The sliding disk 26 here is displaced by the piston 11, and the sensor disk 24 is displaced by the sliding disk 26. The sensor 7 detects the position of the sensor disk 24. The sensor disk 24 is connected to the second clutch component 11, so that a position of the piston 11 may be determined with the sensor 7.

The position of the piston 11 and of the second clutch component 9 may thus be determined via the sensor 7. In step a) of the method, the actuator 10 is actuated and the piston 11 is moved from the illustrated starting position 12 toward the end position 13. A measured sensor value 16 is determined in a step b). The temperature 17 of the transmission fluid 14 is determined in step c). An actual position 18 of the piston 11 (between the starting position 12 and the end position 13) is determined in step d) based on the measured sensor value 16 and the determined temperature 17. In step e) the piston 11 is moved, starting from the determined actual position 18, into the end position 13. The temperature 17 of the transmission fluid 14 is determined by measuring an electrical resistance 19 of the coil 27 of the actuator 10 or by measuring a first time interval between actuation of the actuator 10 according to step a) and the detection by the sensor 7 of an intermediate position 20 that is reached by the piston 11.

Portions of the clutch 5, for example the clutch components 8, 9, a sensor disk 24, a disk spring 25, designed as a return spring for returning the second clutch component 9 and the piston 11, a sliding disk 26, and the piston 11 of the actuating unit 6, are acted on by the transmission fluid 14 or are moved through the transmission fluid 14. The viscosity of the transmission fluid 14 thus determines the switching time of the clutch 5. In addition, the sensor 7 generates temperature-dependent measured sensor values 16, so that a position of the piston 11 cannot be (accurately) determined by sensor 7 independently of the temperature 17.

The actuator 10 includes a coil 27 which for moving the piston 11 is acted on by an electric current. In the present case, the coil 27 of the actuator 10 is used as a temperature sensor. Use is made of the fact that an electrical resistance 19 of the coil 27 changes as a function of the temperature 17 (variant i. of the method). This temperature dependency may be stored, for example, in a characteristic map 21 in a control unit 30.

Within the scope of the disclosed method, it is assumed that the temperature 17 of the coil 27 at least substantially corresponds to the temperature 17 of the transmission fluid 14. The temperature 17 of the transmission fluid 14 may thus be deduced from the temperature 17 of the coil 27, and on the one hand the (temperature-dependent) measured sensor value 16 determined in step b) may be interpreted with knowledge of the temperature 17 determined in step c). On the other hand, via the temperature 17 determined in step c) the viscosity of the transmission fluid 14, and thus, the speed of the components comprising the piston 11 and the clutch 5 that are moved by the transmission fluid 14, may be determined. Starting from the actual position 18 of the piston 11 (step d)), a second time interval may thus be determined after the piston 11, starting from the actual position 18, reaches the end position 13.

By use of the method, the piston 11 may be further moved from a (more) accurately determined actual position 18 into the end position 13. The speed of the piston 11 may likewise be determined as a function of the determined temperature 17. Reaching the first state 15 may therefore be determined with increased accuracy, so that enabling the transmission of a torque via the clutch components 8, 9 may now take place more quickly.

According to variant ii. of the method, the temperature 17 of the transmission fluid 14 (step c)) is determined by the sensor 7 based on a first time interval between the actuation of the actuator 10 according to step a) and the detection of an intermediate position 20 that is reached by the piston 11. It is assumed that the first time interval varies as a function of the viscosity of the transmission fluid 14 (and thus of the temperature 17 of the transmission fluid 14).

The actual position 18 of the piston 11 is determined from a characteristic map 21 in step d). Correction factors for the measured sensor values 16 are stored in the characteristic map 21 as a function of the temperature 17. In this way, the measured sensor value 16 determined in step b) may be interpreted, and the actual position 18 of the piston 11 may thus be determined with greater accuracy.

In particular, a threshold value 22 is defined for the (temperature-dependent) measured sensor value 16 determined in step b); when the measured sensor value 16 determined in step b) corresponds to the threshold value 22, it is assumed that the piston 11 has moved from the starting position 12 into the intermediate position 20, wherein the clutch components 8, 9 in the intermediate position 20 of the piston 11 are (not yet) connected to one another in a form-fitting manner. The threshold value 22 is set in such a way that on the one hand a form-fitting connection of the clutch components 8, 9 is not yet present in each case (in particular at low temperature 17), and on the other hand (at elevated temperature 17, for example) a form-fitting connection is immediately present after the threshold value 22 is exceeded.

In the method, based on the temperature 17 determined in step c), a second time interval is determined in which the piston 11, starting from the actual position 18, reaches the end position 13; wherein the second time interval is taken into account for carrying out step e). The piston 11 may now be further moved from the (more) accurately determined actual position 18 into the end position 13, wherein the speed of the piston 11 may likewise be determined as a function of the ascertained temperature 17. Reaching the first state 15 may therefore be determined with increased accuracy, so that enabling the transmission of a torque via the clutch components 8, 9 may now take place more quickly.

The second time interval is likewise determined from a (further) characteristic map 21. Values of the second time interval are stored in this (further) characteristic map 21 as a function of the determined temperature 17.

Furthermore, it is disclosed that for measuring the electrical resistance 19 of the actuator 10 (for example, the coil 27 of the actuator 10), the actuator 10 is acted on by a test signal 23 that includes an electric current and a voltage, wherein the piston 11 is not moved by the test signal 23. Based on the measurement of the electrical resistance 19 (variant i. of the method), the temperature 17 of the transmission fluid 14 may thus be determined with sufficient accuracy.

FIG. 2 shows a diagram with multiple characteristic curves 28 of a sensor. The measured sensor value 16 measured in step b) is plotted on the vertical axis. The position of the piston 11, i.e., the path 29 beginning from a starting position 12, is plotted on the horizontal axis.

The three characteristic curves 28 illustrate the dependency of the measured sensor value 16 on the temperature 17. The middle characteristic curve 28 shows the characteristic curve 28 of the sensor 7 at an average temperature 17, for example 20 degrees Celsius. The lower characteristic curve 28 shows the characteristic curve 28 of the sensor 7 at a low temperature 17, for example −20 degrees Celsius. The upper characteristic curve 28 illustrated by a dashed line shows the characteristic curve 28 of the sensor 7 at a high temperature 17, for example 60 degrees Celsius.

A threshold value 22 is defined for the (temperature-dependent) sensor value 16 measured in step b); when the measured sensor value 16 determined in step b) corresponds to the threshold value 22, it is assumed that the piston 11 has moved from the starting position 12 into the intermediate position 20, wherein in the intermediate position 20 of the piston 11, the clutch components 8, 9 are (not yet) connected to one another in a form-fitting manner. The threshold value 22 is set in such a way that on the one hand a form-fitting connection of the clutch components 8, 9 is not present in each case (in particular at low temperature 17, in the present case, the lower characteristic curve 28), and on the other hand (for example at elevated temperature 17, in the present case, the upper characteristic curve 28) a form-fitting connection of the clutch components 8, 9 is immediately present after the threshold value 22 is exceeded.

When the threshold value 22 is reached, the piston 11 is thus in an intermediate position 20 in which a form-fitting connection of the clutch components 8, 9 is not present in each case. By measuring a first time interval between actuation of the actuator 10 according to step a) (at this point in time the piston 11 is in the starting position 12) and the detection by the sensor 7 of an intermediate position 20 that is reached by the piston 11, the speed of the piston 11 during the movement through the transmission fluid 14 may be determined. The viscosity of the transmission fluid 14, and thus its temperature 17, may be deduced from the speed of the piston 11. Based on the temperature 17, the appropriate characteristic curve 28 for the sensor 7 may be selected and the actual position 18 of the piston may thus be determined with sufficient accuracy. Starting from the actual position 18 of the piston 11 (step d)), it is then possible to determine a second time interval (taking the viscosity of the transmission fluid 14 into account) after the piston 11, starting from the actual position 18, reaches the end position 13.

LIST OF REFERENCE NUMERALS 1 drive train
2 vehicle
3 transmission housing
4 clutch unit
5 clutch
6 actuating unit
7 sensor
8 first clutch component
9 second clutch component
10 actuator
11 piston
12 starting position
13 end position
14 transmission fluid
15 first state
16 measured sensor value
17 temperature
18 actual position
19 resistance
20 intermediate position
21 characteristic map
22 threshold value
23 test signal
24 sensor disk
25 disk spring
26 sliding disk
27 coil
28 characteristic curve
29 path
30 control unit

The invention claimed is:

1. A method for operating a drive train of a vehicle, wherein the drive train has at least a transmission housing, and a clutch unit situated therein with a clutch that acts in a form-fitting manner, as well as an actuating unit for actuating the clutch, and a sensor for determining the coupling status; wherein the clutch includes at least a first clutch component and a second clutch component that are connected to one another in a form-fitting manner when the clutch is actuated; wherein the actuating unit includes an electromagnetic actuator having a piston; wherein for actuating the clutch the piston is moved from a starting position into an end position; wherein at least the piston and the clutch are acted on at least partially by a transmission fluid; wherein a torque is transmitted via the clutch components only after a fully engaged first state of the clutch components is determined in which the piston is in the end position; wherein a position of the piston may be determined with the sensor; and wherein the method includes at least the following steps:

a) actuating the actuator and moving the piston from the starting position;
b) ascertaining a measured sensor value;
c) ascertaining a temperature of the transmission fluid;

d) determining an actual position of the piston based on the measured sensor value and the temperature; and e) moving the piston, starting from the determined actual position, into the end position;

wherein the temperature of the transmission fluid is ascertained at least by i) measuring an electrical resistance of the actuator, or ii) measuring a first time interval between actuation of the actuator according to step a) and the detection by the sensor of an intermediate position that is reached by the piston.

2. The method of claim 1, wherein the measured sensor value is determined continuously during the displacement of the piston.

3. The method of claim 1, wherein the measured sensor value is a function of temperature, and the actual position of the piston is determined in step d) from a characteristic map, taking the determined temperature into account.

4. The method of claim 1, wherein a threshold value is defined for the measured sensor value, and when the measured sensor value determined in step b) corresponds to the threshold value, it is determined that the piston has moved from the starting position into the intermediate position, wherein the clutch components in the intermediate position are not connected to one another in a form-fitting manner.

5. The method of claim 1, wherein, based on the determined temperature, a second time interval is determined in which the piston, starting from the actual position, reaches the end position; wherein carrying out step e) is coordinated with the second time interval.

6. The method of claim 5, wherein the second time interval is determined from a characteristic map.

7. The method of claim 1, wherein, for measuring the electrical resistance of the actuator, the actuator is acted on by a test signal that includes an electric current and a voltage, wherein the piston is not moved by the test signal.

8. A drive train of a vehicle, including at least a transmission housing, and a clutch unit situated therein with a clutch that acts in a form-fitting manner, as well as an actuating unit for actuating the clutch, and a sensor for determining the coupling status; wherein the clutch includes at least a first clutch component and a second clutch component that are connectable to one another in a form-fitting manner when the clutch is actuated; wherein the actuating unit includes an electromagnetic actuator having a piston; wherein the piston is movable from a starting position into an end position in order to actuate the clutch; wherein at least the piston and the clutch are acted on at least partially by a transmission fluid; wherein transmission of a torque via the clutch components does not occur until a fully engaged first state of the clutch components is determined for which the piston is in the end position; wherein a position of the piston may be determined with the sensor; wherein the drive train is configured for carrying out a method including at least the following steps:

a) actuating the actuator and moving the piston from the starting position;

b) ascertaining a measured sensor value;

c) ascertaining a temperature of the transmission fluid;

d) determining an actual position of the piston based on the measured sensor value and the temperature; and e) moving the piston, starting from the determined actual position, into the end position;

wherein the temperature of the transmission fluid is ascertained at least by i) measuring an electrical resistance of the actuator, or ii) measuring a first time interval between actuation of the actuator according to step a) and the detection by the sensor of an intermediate position that is reached by the piston.

9. The drive train of claim 8, wherein the measured sensor value is determined continuously during the displacement of the piston.

10. The drive train of claim 8, wherein the measured sensor value is a function of temperature, and the actual position of the piston is determined in step d) from a characteristic map, taking the determined temperature into account.

11. The drive train of claim 8, wherein a threshold value is defined for the measured sensor value, and when the measured sensor value determined in step b) corresponds to the threshold value, it is determined that the piston has moved from the starting position into the intermediate position, wherein the clutch components in the intermediate position are not connected to one another in a form-fitting manner.

12. The drive train of claim 8, wherein, based on the determined temperature, a second time interval is determined in which the piston, starting from the actual position, reaches the end position; wherein carrying out step e) is coordinated with the second time interval.

13. The drive train of claim 12, wherein the second time interval is determined from a characteristic map.

14. The drive train of claim 8, wherein, for measuring the electrical resistance of the actuator, the actuator is acted on by a test signal that includes an electric current and a voltage, wherein the piston is not moved by the test signal.

\* \* \* \* \*